United States Patent [19]

Silver

[11] 3,946,613
[45] Mar. 30, 1976

[54] ELECTRONIC THERMOMETER AND PROBE

[75] Inventor: Seymour Silver, Westbury, N.Y.

[73] Assignee: LMC Data, Inc., New York, N.Y.

[22] Filed: Mar. 7, 1974

[21] Appl. No.: 449,041

[52] U.S. Cl. ........................................ 73/362 AR
[51] Int. Cl.² ...................... G01K 1/14; G01K 7/24
[58] Field of Search ............................. 73/362 AR

[56] References Cited
UNITED STATES PATENTS

| | | | |
|---|---|---|---|
| 2,195,019 | 3/1940 | Bloomheart | 73/362 AR |
| 2,818,482 | 12/1957 | Bennett | 73/362 AR X |
| 2,938,385 | 5/1960 | Mack et al. | 73/362 AR |
| 3,485,102 | 12/1969 | Glick | 73/362 AR |
| 3,550,448 | 12/1970 | Ensign | 73/362 AR X |
| 3,681,991 | 8/1972 | Eberly | 73/362 AR |
| 3,750,471 | 8/1973 | Bremer | 73/362 AR X |

Primary Examiner—Richard C. Queisser
Assistant Examiner—Frederick Shoon
Attorney, Agent, or Firm—Kenyon & Kenyon Reilly Carr & Chapin

[57] ABSTRACT

An electronic thermometer for home use comprising a casing containing a bridge circuit; a flexible probe containing a thermistor, said thermistor being permanently affixed to said bridge circuit through a lead wire and permanently calibrated to said bridge circuit; and further including storage means integral with said casing for storing said probe and said lead wire when not in use.

2 Claims, 4 Drawing Figures

ELECTRONIC THERMOMETER AND PROBE

BACKGROUND OF THE INVENTION

This invention relates generally to electronic thermometers and probes utilized therewith, and particularly to a type of probe and its relationship to the thermometer.

Electronic thermometers are now well-known in the art generally consisting of a temperature sensitive resistance element such as a thermistor forming one arm of a bridge circuit. The thermistor is usually contained in the tip of a probe, which probe is put in contact with the body in order to sense the temperature which temperature is then electrically measured by the bridge circuit and eventually read out on either a dial or in digital form. Heretofore, such electronic thermometers have been used almost exclusively in clinical surroundings such as hospitals, doctors' offices and the like. This has in part been due to the fact that, because electronic thermometers require a high degree of accuracy and stability to be of any use, they have been relatively expensive to manufacture and as a result generally beyond the financial means of the average consumer. Further, the almost exclusive clinical use of electronic thermometers have led them to be designed with certain features which are undesirable for a thermometer suitable for home use. For example, most electronic thermometers utilized today have probes which are connected to the thermometer by some type of jack assembly. This is necessary so that different probes can be used with different thermometers in a place such as a hospital or the like where many units are in use. Also, because one unit generally services a number of unrelated patients, it has heretofore been necessary to provide some form of disposable probe which could be utilized with one patient and then discarded. Such disposable probes have generaly taken the form of rigid plastic sheath which is placed over a rigid probe making an electrical contact thereto. Thus, while the above-described features have served as advantages for thermometers used in large clinical applications, they also have marked disadvantages which are tolerated in clinical applications but very undesirable if the thermometer is to be used by the average family in a domestic setting. For example, most probes used in present electric thermometers are rigid thereby presenting a danger of injury to the patient, especially in the case of small children where the thermometer is generally used rectally. Further, since most probes are attached to the thermometer by some type of jack assembly so as to be interchangeable among different thermometers, when a probe is used with a thermometer other than the one for which it was originally intended, the second thermometer must be recalibrated for use with that probe. In a clinical setting, where the personnel are well-trained, this is somewhat of a problem, but to the average consumer with no training it would be a large problem. Also providing circuitry for such recalibration markedly increases the cost of the device. Further, since the average electronic thermometer used in clinical settings is used many times a day, there is little need to worry about storing it or the probe and little concern about its size. On the other hand, to be satisfactory for home use which occurs only when there is illness, the thermometer and probe must be compact and capable of easy storage in a medicine cabinet or the like.

It is therefore an object of the present invention to supply a small compact, accurate, inexpensive electronic thermometer capable of being used by the average consumer.

It is a further object of this invention to provide a flexible probe which is safe and not a danger to patients, particularly children.

It is a further object of this invention to provide a probe which is permanently affixed to a single thermometer, thereby avoiding the necessity of recalibration.

It is a further object of this invention to provide a probe and thermometer such that the probe and its connecting wire are readily stored on the thermometer itself in a compact fashion.

These and other objects of the present invention will be readily apparent from the following description and drawings wherein.

Figure 1:
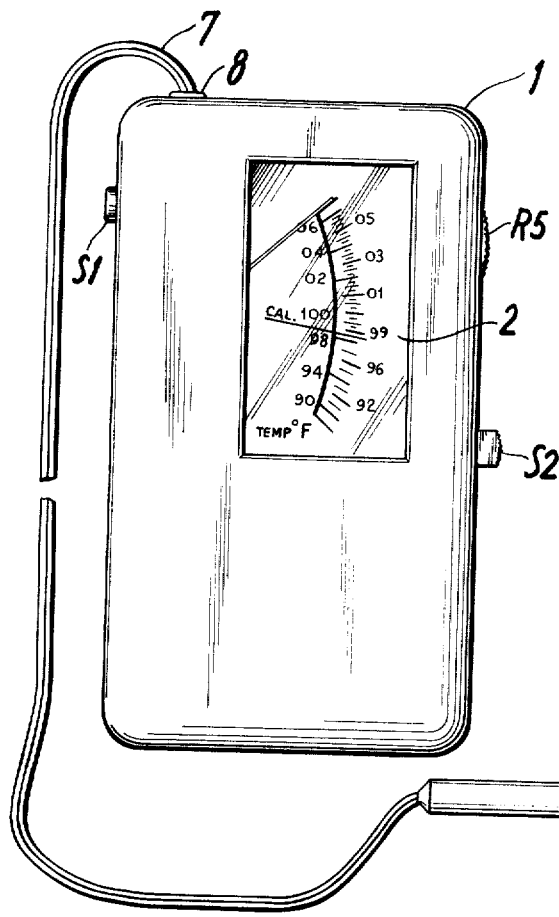
FIG. 1 is a front view of the thermometer of the present invention with the probe in position for use.

Referring to FIG. 1, it can be seen that the thermometer consists of a plastic case 1 having a dial 2 thereon from which the temperature is read. Associated with the thermometer is a flexible probe generally designated 3 which consists of a generally cylindrical main body portion 4 and a thinner generally cylindrical probe section 5 having a thermistor 6 at its end. The entire probe assembly should be approximately the same size as the longitudinal dimension of case 1 for ease of storage as more fully explained hereinafter. In order to insure flexibility, both upper probe portion 4 and lower probe portion 5 are preferably made of nylon or some other suitable flexible material such as delrin. The thermistor 6 is preferably a standard wafer type thermistor which is secured in the tip of lower probe portion 5 through the use of a material such as epoxy. Probes of the above general construction can be used for either oral or rectal use, although for rectal use the lower probe portion 5 is generally shorter and the upper probe portion 4 is generally of larger diameter than for an oral probe in order to insure that the probe cannot be inserted in the patient beyond a safe distance.

Figure 4:
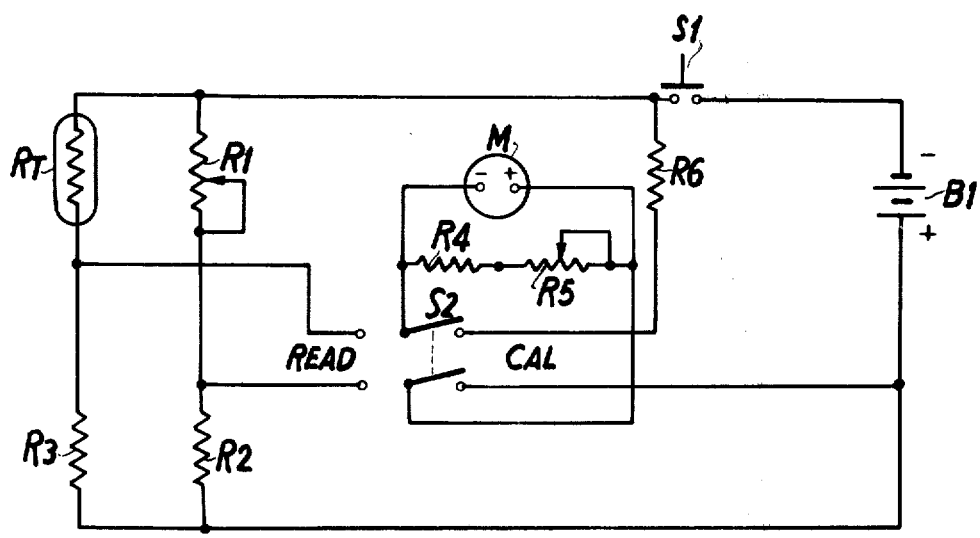
FIG. 4 is a schematic representation of the circuit of the thermometer of the present invention.

Connected to the thermistor 6 are lead wires which run through the probe and through connecting wire 7 to the thermometer where they are permanently affixed to the thermometer circuitry through an opening 8 in case 1. The thermistor designated RT in FIG. 4, thus forms one arm of the bridge circuit shown schematically in FIG. 4. Since the thermistor is permanently affixed to the thermometer, once the thermometer is calibrated for that particular thermistor, it needn't be calibrated again as in the case with thermometers which have interchangeable probes. This enables the circuitry required to be relatively simple and inexpensive since additional circuitry to accomplish recalibration is unnecessary. The only calibration circuitry required is that to assure that the power source, battery B1 in FIG. 4, is operating properly. This is accomplished simply be placing switch S2 in the calibrate position which switches variable resistance R5 into the circuit where it is adjusted until the indicator on dial 2 indicates that the power source is functioning by reaching a predetermined point on the scale (designated "Cal." in FIG. 1). Once this has been done, switch S2 is moved to the on position switching the thermistor RT back into the circuit and after a short time the temperature is then read on dial 2 as the bridge circuit balances the change in resistance RT caused by a change in the temperature of the patient.

Figure 2:
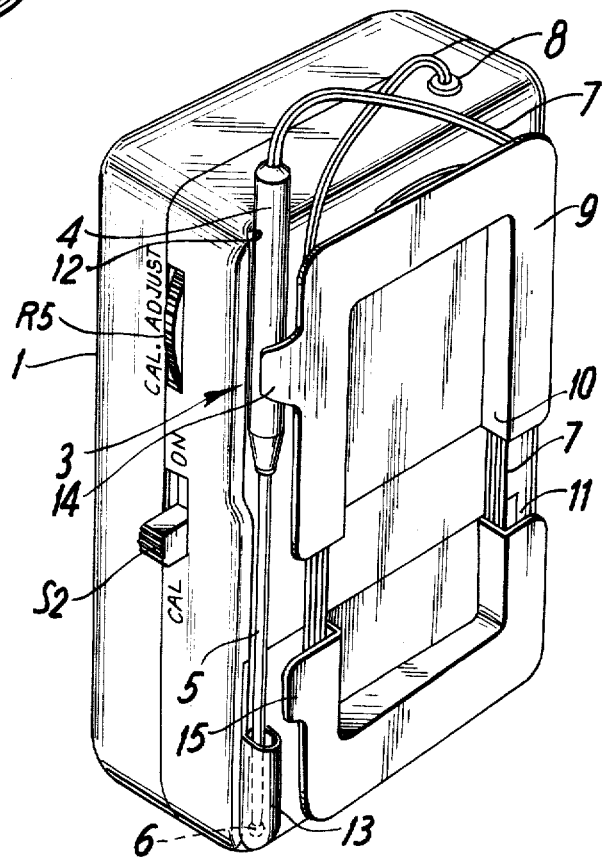
FIG. 2 is a perspective view of the thermometer of the present invention with the probe in storage position.
Figure 3:
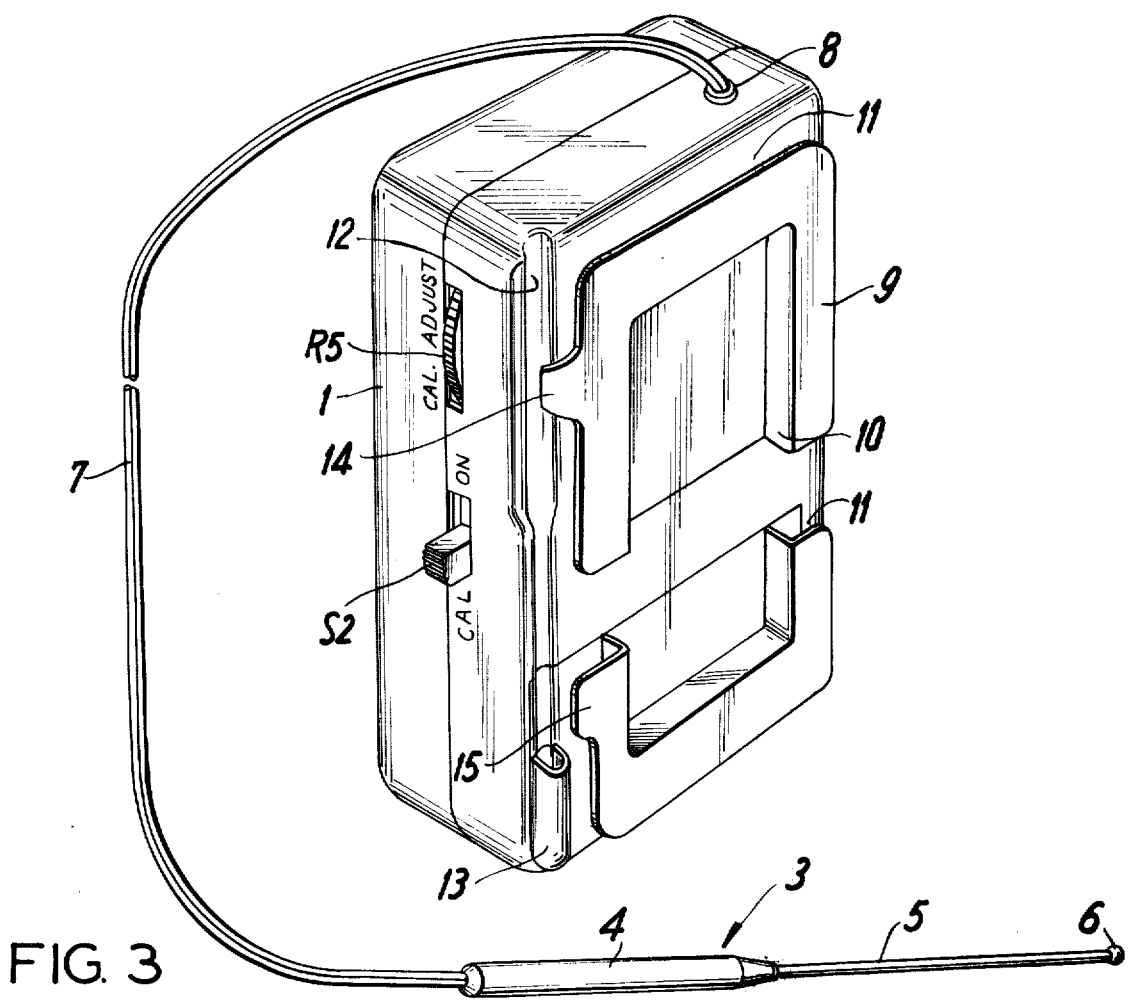
FIG. 3 is a perspective view of the thermometer of the present invention with the probe in position for use.

After the thermometer has been used and it is desired to store it, it is provided with a built-in storage rack for the probe 3 and the lead wire 7. As shown in FIG. 3, the back of the casing 1 is provided with a protruding member 10 which is perpendicular to the rear of the case 1. Integral with protruding member 10 and perpendicular thereto (and therefore parallel to case 1) is flange portion 9 which is slightly smaller in area than the area of the rear of case 1. Thus, a channel 11 is formed between the rear of case 1 and flange 9 which channel is capable of holding lead wire 7. Lead wire 7 is designed to be of such length that when wrapped around protruding member 10 in channel 11 as shown in FIG. 2, the end of lead wire 7 where it joins upper probe portion 4 will just reach a little beyond the upper left hand corner of the rear of case 1. Beginning in the upper left hand corner of the rear of case 1 and running in a longitudinal direction down the side of the rear of case 1 an indentation 12 is formed in the rear of case 1, said indentation being of the same general shape as probe 3 such that probe 3 will lie in said indentation when stored. At the bottom of said indentation a small well-like member 13 is formed which is capable of holding the end of probe 3. Flange 9 is provided with the tabs 14 and 15 which are curved downward so when probe 3 is placed in indentation 12 it slides under tabs 14 and 15 and is kept from rolling out of indentation 12. As is readily apparent from an examination of FIG. 2, the above-described arrangement provides a simple way of storing both probe 3 and lead wire 7 in a compact fashion so that the entire thermometer assembly may be readily stored in a home medicine cabinet or the like.

Thus, the present invention provides a simple, inexpensive, easily stored thermometer capable of home use.

What is claimed is:
1. An electronic thermometer comprising:
   a. a casing containing a bridge circuit for measuring temperature;
   b. a flexible probe of approximately the same length as the longitudinal dimension of said casing;
   c. a thermistor mounted in the end of said probe forming one arm of said bridge circuit and being permanently calibrated with said bridge circuit and being permanently connected to said bridge circuit through a lead wire; and
   d. means for storing said lead wire and said probe on said casing, said storage means comprising:
      i. a protuberance integral with said casing and perpendicular thereto;
      ii. a flange integral with said protuberance and perpendicular thereto such that a channel is formed between said flange and said casing such that when said lead wire is wrapped around said protuberance it resides in said channel;
      iii. an indentation on a longitudinal edge of said casing, said indentation being of the same general shape as said probe; and
      iv. a cylindrical well member at the bottom of said indentation for holding the tip of said probe.
2. The thermometer of claim 1 wherein said channel is of generally rectangular shape.

* * * * *